J. N. DELL.
SOAP HOLDER, STRAINER, AND SCOOP.
APPLICATION FILED APR. 14, 1921.
1,419,545.
Patented June 13, 1922.
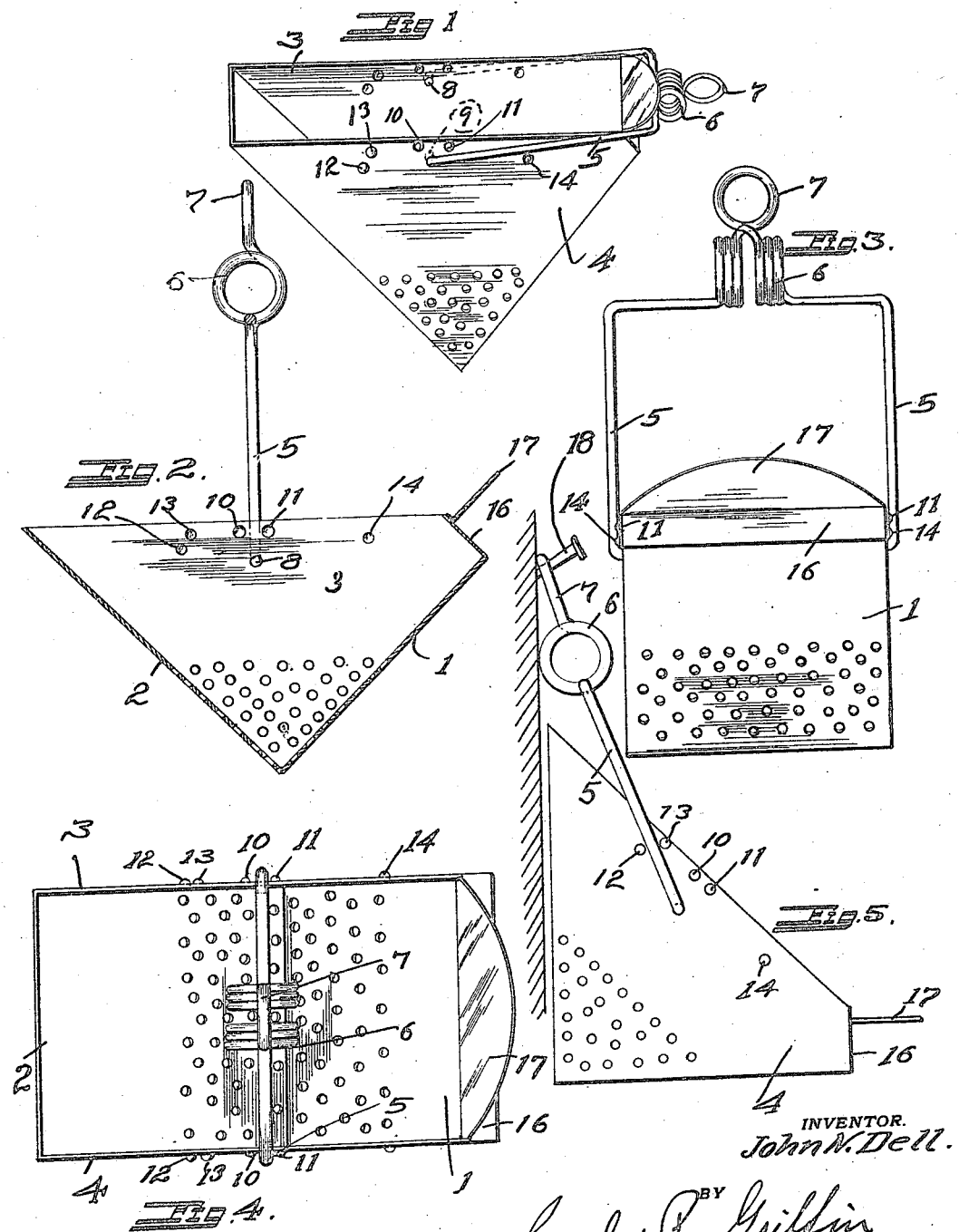

UNITED STATES PATENT OFFICE.

JOHN N. DELL, OF SAN FRANCISCO, CALIFORNIA.

SOAP HOLDER, STRAINER, AND SCOOP.

1,419,545. Specification of Letters Patent. Patented June 13, 1922.

Application filed April 14, 1921. Serial No. 461,330.

*To all whom it may concern:*

Be it known that I, JOHN N. DELL, a citizen of Jugo-Slavia, residing at San Francisco, in the county of San Francisco, State of California, have invented a new and useful Soap Holder, Strainer, and Scoop, of which the following is a specification in such full and clear terms as will enable those skilled in the art to construct and use the same.

This invention relates to a combined soap-holder, strainer and scoop and its object is to provide a device which can be used for cleaning sinks and for a number of other household uses about the kitchen.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a perspective view of the strainer.

Fig. 2 is a vertical sectional view of the strainer.

Fig. 3 is a view of the strainer looking at right angles to Fig. 2.

Fig. 4 is a plan view of the strainer and

Fig. 5 is a side elevation of the strainer showing it in use as a soap-holder.

The strainer consists of a base member 1 and side member 2 extending at right angles thereto. These two members are joined by the two triangular side members 3 and 4. The triangular side members and the two base members are provided with perforations near the apex of the triangular side members.

A spring bail 5 with a coil 6 and ring 7 is connected to the two side members by means of the two hooks 8 and 9. The bail is frictionally held in either the position shown in Figures 1, 2 or 5 by raised projections 10 to 15 inclusive forced outwardly from the sides 3 and 4.

The edge of the bottom 1 distant from the bottom 2 is provided with a raised ledge 16 over which a forwardly projecting lip 17 extends.

In operation the strainer is used as a scoop as shown in Fig. 1 and as the bail is long enough to pass below the V-shaped portion of the scoop, it may be changed to the position shown in Figure 2 when the scoop is to be used to pour liquid through, or if it is desired to use the scoop as a soap-holder it may be hung from a nail 18 and used in the position shown in Figure 5.

In order to hold the bail firmly in any one of its several positions, the sides of the scoop are pressed outwardly to form the projecting knobs 10 to 14 inclusive on each side, the bail frictionally engaging said knobs to hold it in one of the three positions desired.

What I claim is as follows, but various modifications may be made in the construction shown in the drawings and above particularly described form, within the purview of my invention:

A combined soap holder and strainer consisting of a pyramidal body having a plurality of openings adjacent its apex, a bail pivotally mounted on said body and movable to a plurality of positions with respect thereto, lugs on the sides of the body to secure the bail in several positions with respect to said body, and a projecting lip to assist in using said strainer as a scoop against which said bail bears when in one position.

In testimony whereof I have hereunto set my hand this 7th day of April, A. D. 1921.

JOHN N. DELL.